Jan. 2, 1951  S. L. C. COLEMAN  2,536,626
AIR SPRING AND SHOCK ABSORBER
Filed Dec. 19, 1946  2 Sheets-Sheet 1
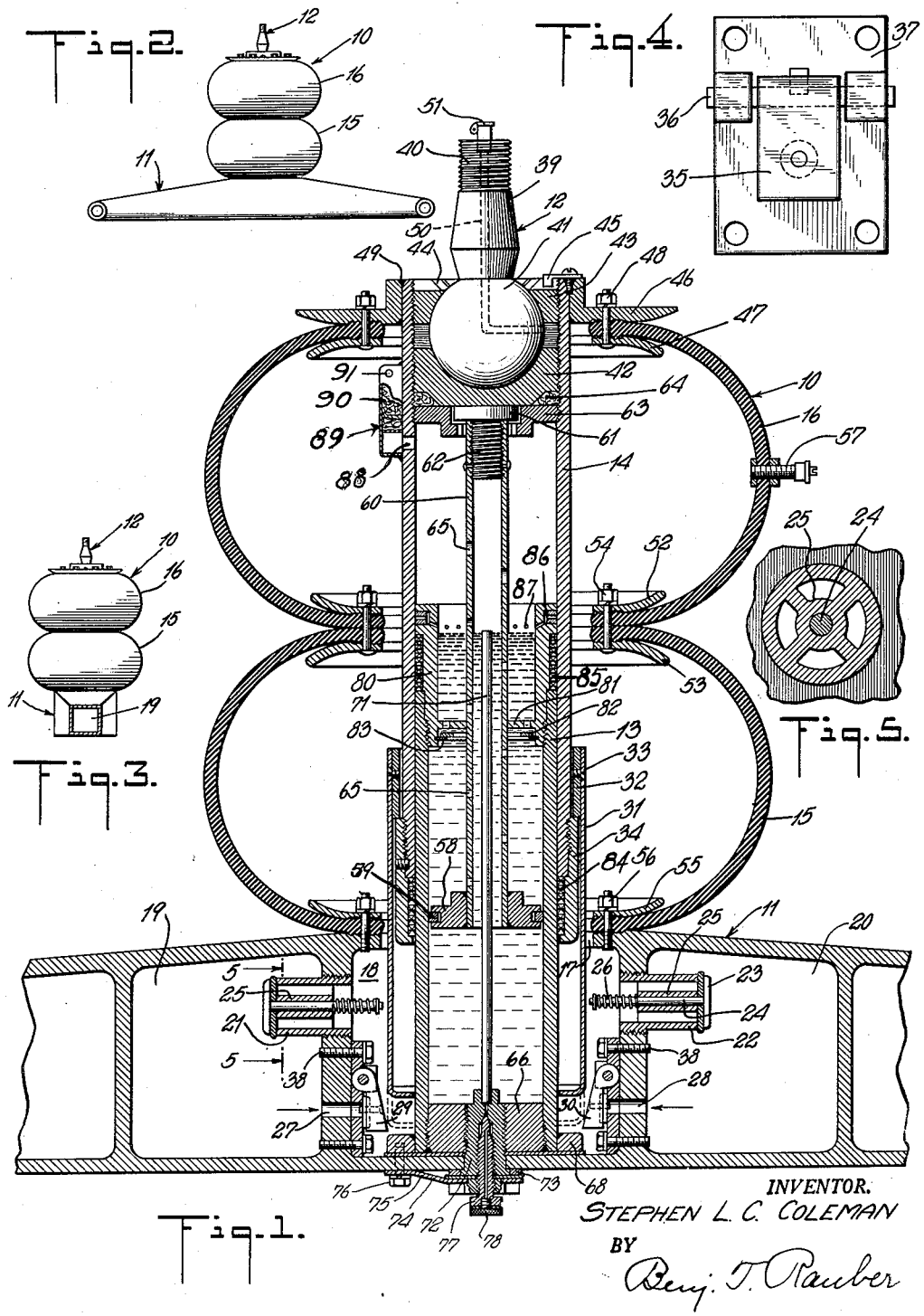
INVENTOR.
STEPHEN L. C. COLEMAN
BY
Benj. T. Rauber
ATTORNEY Jan. 2, 1951  S. L. C. COLEMAN  2,536,626
AIR SPRING AND SHOCK ABSORBER
Filed Dec. 19, 1946  2 Sheets-Sheet 2

INVENTOR.
STEPHEN L. C. COLEMAN
BY
Benj. T. Rauber
ATTORNEY

Patented Jan. 2, 1951

2,536,626

UNITED STATES PATENT OFFICE 2,536,626

AIR SPRING AND SHOCK ABSORBER

Stephen Leonard Chauncey Coleman,
Fredericton, New Brunswick, Canada

Application December 19, 1946, Serial No. 717,305
In Great Britain November 1, 1946

10 Claims. (Cl. 267—64)

My invention relates to a pneumatic spring, particularly to a spring suitable for receiving sharp impacts in vehicles, such for example as automobiles and airplanes, and in which the rebound is checked or deadened. The spring of my invention also provides a liquid or hydraulic means to aid in checking the stroke and rebound.

In the spring of my invention I provide a resilient or elastic air chamber of bellows or other suitable type between the impact transmitting and receiving elements as, for example, between the sprung and unsprung elements of a vehicle.

Communicating with this resilient bellows element are one or more chambers or reservoirs having check valves to receive freely air compressed in the bellows element and to hold it from returning until the bellows element has reached a certain stage or point in its return movement on rebound.

With this arrangement the air compressed on the compression of the bellows element and trapped in the reservoir or chamber does not take part in the rebound until after a considerable part of the rebound has taken place and the air in the bellows has lost its expansive force, whereupon the air released from the reservoir serves to return the spring element to its normal loaded position. In this way the force of the rebound is divided and prevented from attaining velocity.

Within the pneumatic bellows there is also provided a telescoping cylinder or cylinders between the unsprung element and the sprung element to serve as a guide and to protect against sidewise distortion. Within this cylinder is also provided a hydraulic cylinder and a piston which is actuated upon a compression stroke to force liquid from one side of the piston to the other. On the compression stroke the liquid may flow from the compression face of the piston through a series of restricted passages in the hollow piston shaft. On the rebound or up-stroke the liquid returns through these passages. The passages are preferably distributed throughout a hollow stem of the piston in such a manner that as the piston returns on a rebound the number of openings decreases and, therefore, the resistance to flow of the liquid increases thereby increasing the absorption of the rebound shock.

The shortening movement of the telescoping cylinders may also be arranged to operate an element such as a sliding sleeve to close the return opening from the air reservoir to the bellows throughout a part of the stroke and return. The upper end of the hydraulic rebound check or shock absorber element is also in communication freely with the bellows element to equalize the air pressure above the liquid level of the hydraulic element with that in the bellows.

The various features of my invention are illustrated, by way of example, in the accompanying drawings in which—

Fig. 1 is a vertical section of a vehicle spring suspension embodying a preferred form of my invention;

Fig. 2 is a side view on a much smaller scale of the spring suspension;

Fig. 3 is a vertical view at right angles to that of Fig. 2 and on a similarly smaller scale;

Figs. 4 and 5 are respectively a side view of one check valve and a section through another check valve taken in line 5—5 of Fig. 1.

Figure 6:
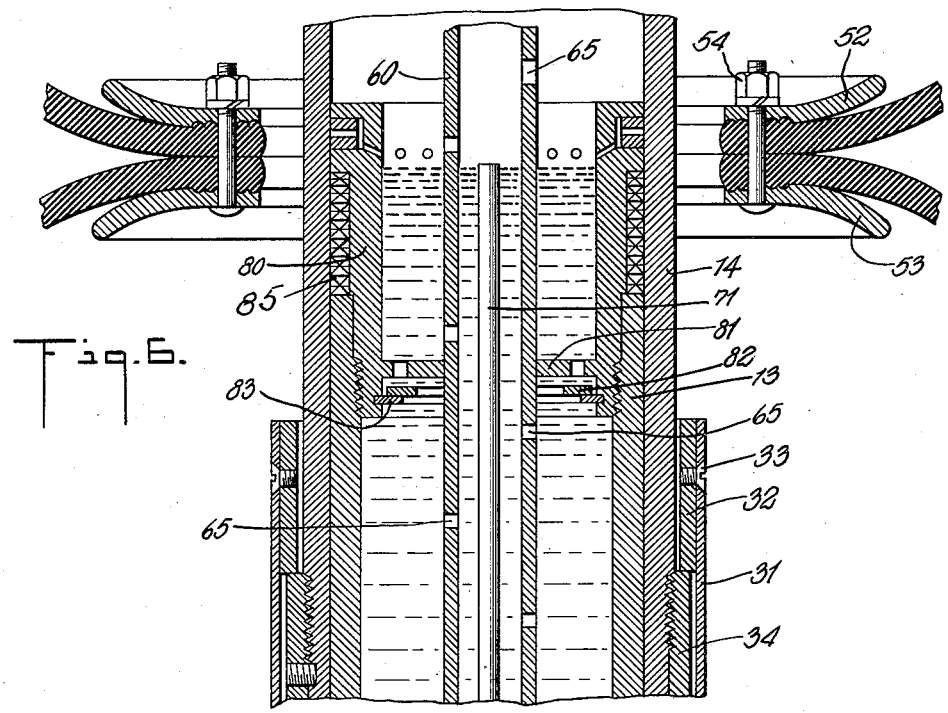
Figs. 6 and 7 are vertical sections, on a larger scale, of parts of the hydraulic rebound checking or shock absorber element.
Figure 7:
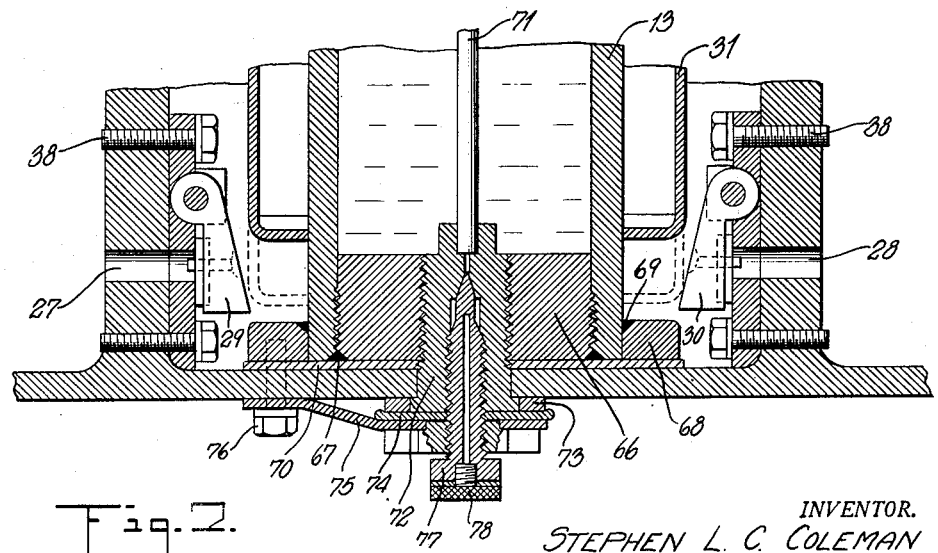

In the accompanying drawings an embodiment of the invention particularly suited for the spring suspension of motor vehicles is illustrated in which an air spring 10 of bellows-like construction is supported between a base 11 carried on a running gear of the vehicle and a support 12 for the sprung weight of the vehicle.

The support 12 is held against side thrusts and the air spring 10 is protected from distortions by a telescoping tube extending upwardly through the air spring 10 and comprising a lower tubular element 13 rigidly mounted in the lower part of the base 11 and an upper tubular element 14 secured to the support 12.

The air spring 10 may comprise any number of bellows elements, two such elements 15 and 16 being shown in the drawings by way of example. These elements may be of the general form of a vehicle tire of small diameter joined together in an air-tight joint to leave central openings through which the telescoping tubes 13, 14 may extend from the base 11 to the support 12. These elements may be formed of any suitable resilient material, preferably of rubber reinforced with fabric.

The upper end of the air spring is sealed gastight to the support 12, and the lower end is secured and sealed gas-tight to the base 11 about an opening 17 through which the telescoping tubes 13, 14 pass with sufficient clearance to provide a free passage of air into a recess 18 within the base 11. The recess 18 in turn communicates with one or more reservoirs 19 and 20 two being shown by way of example). Air may flow freely from the recess 18 into the reservoirs 19 and 20 through inlet check valves 21 and 22 respectively when the air pressure within the air spring 10 exceeds that within the reservoirs.

The valves 21 and 22 may be of any suitable construction, those shown in the drawings comprising a valve plate 23 having a stem 24 extending through a guide 25 and held resiliently on the valve seat by a spring 26 secured between the end of the valve stem 24 and the guide 25. The valves 21 and 22, therefore, freely admit air under pressure from the air spring to the reservoirs when the air spring is compressed, but trap the air and prevent its returning to the air spring or bellows.

Upon a rebound and as the support 12 approaches its normal loaded position in relation to base support 11 the air entrapped in the reservoirs 19, 20, may return through return passages 27 and 28 respectively. During the compression stroke of the air spring the passages 27, 28 are closed by check valves 29 and 30. On a rebound the air tends to return through passages 27, 28, opening the check valves 29, 30.

However, during the greater part of the compression stroke and the initial part of the return or rebound, the valves 29, 30 are held closed by means of a locking sleeve 31 carried by the tubular element 14 which moves with the support 12.

The locking sleeve 31 slides freely on the tubular element 14 and is hung or supported on the lower end of the tubular element 14 by means of a shoulder or collar 32 secured to the upper end of the sleeve by means of a screw 33 and resting on a shoulder 34 secured on the lower end of the tubular element 14.

In the normal loaded position of the air spring, the sleeve 31 is in the position shown in full lines in Fig. 1. When the telescoping tubes 13 and 14 shorten under a compression force the sleeve 31 assumes the position shown in broken lines thereby wedging the return check valves 29 and 30 in position to close the passages 27 and 28. The telescoping tubes 14 and 15 may then shorten still further. The locking sleeve 31 will then be supported on the inclined faces of the check valves 29 and 30. When the air spring and telescoping tubes extend on a rebound the locking sleeve 31 remains in the broken line position till nearly the end of the rebound and until the shoulder or collar 34 contacts the lower face of the collar 32 and lifts the sleeve 31 sufficiently to permit the valves 29, 30, to open. The passages 27, 28 may be somewhat more restricted than the passages through the valves 21 and 22.

Through the above construction when the air spring is compressed by an upward thrust on the support 11 or a downward movement of the support 12, the compressed air flows into the reservoirs 19 and 20 respectively, trapping a portion of the air. On rebound the amount of air exerting an upward thrust on the support 12 is thus less than the amount available in the air spring under normal loaded position and the thrust is thus greatly minimized.

However, as the spring approaches its normal loaded position air may then return from the reservoirs to give the normal supporting pressure. In this way the force of the rebound is moderated and controlled, the air pressure decreasing more rapidly at the beginning of the rebound and being reinforced toward the end as its force dies out.

The check valves 29 and 30 may be of any suitable construction, but as shown in detail in Fig. 4 may consist of a plate 35 supported at its upper end by a pintle 36 mounted in a plate 37 secured to the wall of the respective reservoirs 19 and 20 by screws or other suitable fastening means 38.

The support 12 may be secured to the upper part of the bellows or spring element in any suitable manner. As shown in the specific embodiments in the accompanying drawings, it comprises a tapered shaft 39 which may be secured to the chassis or unsprung weight for which purpose it is threaded as at 40 at its upper end. The lower end of the shaft 39 is provided with a ball 41 which rests on a block 42 threaded into the upper end of the tube 14 and having a seat or recess of globular curvature complementary to the ball 41. The ball 41 is retained in its seat on the block 42 by means of a plug 43 having a face complementary to the ball 41.

The plug 43 may be threaded downwardly in the tube 14 to retain the ball 41 in a close fit with the block 42 and is preferably provided with recesses 44 at spaced intervals in its upper surface into which a retainer 45, secured to the tube 14, may be inserted thereby preventing the plug 43 from unscrewing during vibrations. Also secured to the upper end of the tube 14 is an outwardly flaring or flanged collar 46 to which the upper edge of the air spring or bellows element 16 may be secured in gas-tight joint by means of a ring 47 secured to the collar 46 by means of bolts 48, or any other suitable securing means.

The collar 46 may be secured to the upper end of the tube 14 by any suitable means, such as by welding as indicated at 49. The outer edges of the flange 46 and ring 47 are curved reversely to provide a gradual or rounded contact with the bellows 16 and may be roughened on their opposed edges to grip the upper edge of the air spring or bellows more firmly.

The above arrangement permits the supporting member 11 to rock to a limited extent with reference to the sprung mass and follow the undulations of the axle and thus avoid destructive side stresses. A lubricating duct 50 and grease cup 51 may be provided in the stem 39.

The two bellows elements 15 and 16 may be secured together in any suitable way as, for example, by a pair of reversely dished rings 52 and 53 having roughened edges between which the adjacent ends of the bellows are inserted and gripped by means of bolts 54. The lower end of the bellows element 15 is secured directly to the support 11 by means of a securing collar 55 and bolts 56, the collar 55 being suitably rounded and provided with a roughened gripping surface to engage the lower end of the bellows element 15. The air spring may be filled by any type of air pump through any suitable device, such as an ordinary tire valve 57.

The rebound of the air spring is further modified by a hydraulic checking or dampening means within the telescoping tubes 13 and 14. This checking mechanism comprises a piston 58 slidable vertically within the inner tubular element 13 against which it is sealed by a suitable sealing ring 59 and supported adjacent the block 42 by means of a hollow piston stem 60. The piston stem 60 may be secured by any suitable securing means. In the specific embodiment shown in the drawings it is secured by a disc 61 having a depending stem 62 threaded and locked into the upper end of the stem 60. The disc 61 is secured in contact with the block 42 and the tube element 14 by means of a recessed disc 63 having a threaded edge screwed into the tube 14 immediately below the block 42.

This method of attaching the piston stem 60 permits of slight sidewise play and allows the piston stem to align itself with the piston 58 and other parts of the spring. Preferably the plug 42 has an annular recess adjacent the plate or disc 63 which is filled with a circular gasket 64 to provide a gas-tight connection.

The tube 13 is filled with a suitable fluid, such as an oil or shock absorber fluid, to a level near the top of the tube 13. When the piston 58 moves downwardly relative to the base 11 it decreases the volume or space below the piston and forces a corresponding amount of the fluid upwardly through the hollow stem 60. The stem 60 is provided with a series of spaced openings 65 which increase in size toward the upper end of the piston and through which liquid may flow from the space below the piston to the space above it.

The lower end of the tubular element 13 is closed by a plug 66 threaded into the lower end of the tube and sealed by circular welds 67.

The tubular element 13 may also be provided on its outer surface with a shoulder 68 formed integrally thereon or welded by means of circular welds 69.

A flat gasket 70 is sealed between the bottom plate of the base 11 and the lower surface of the plug 66, tubular element 13 and flange 68. The flange 68 serves also to secure the tubular element to the base 11 by any suitable securing means.

A filling tube 71 of small diameter is secured in the plug 66 by being brazed to a screw plug 72 threaded into the plug 66 and extends upwardly into the hollow piston stem 60. The screw plug 72 is provided with a ring gasket 73 between the head of the screw 72 and the lower face of the base 11 so as to form a fluid-tight seal. The gasket may be protected by a ring 74 with upturned edges. The plug may be prevented from turning by a side plate 75 secured thereto and secured to the lower face of the base by means of a screw 76. The plug 72 is provided with a central filling opening or passage communicating with the filling tube 71. This opening is normally closed by means of a screw 77 having a tapered upper end closing the passage into the tube 71, but may be threaded outwardly a short distance whereupon passage is provided through the central opening of the screw into the tube 71. The lower end of the filling screw 77 is in turn closed by a screw cap 78.

To fill the tubes 13 and 14 with a shock absorber fluid, such as a dewaxed oil, the screw cap 78 is removed, the screw 77 is slightly withdrawn from its closed position and oil or fluid forced upwardly through the screw 77 into and through the tube 71 to force the oil into the telescoping tubes. Upon removal of the grease gun excess oil may be permitted to flow out until its level reaches the upper end of the tube 71, thus entrapping a predetermined amount of fluid in the apparatus, thereupon the screw 77 is screwed tightly in position and the screw cap 78 replaced, thereby providing a double seal against the escape of fluid.

As the piston 58 approaches the bottom of tube 13 on a compression stroke the oil is forced upwardly through the hollow stem into the spaces above the piston. The oil is permitted to flow under light resistance upwardly through the hollow stem 60 and the openings 65 into the spaces above the piston. The escapement of the oil above the piston upon rebound is, however, controlled by progressive resistance. For this purpose the space about the piston is divided into two chambers by means of a collar 80 threaded into the upper end of the tubular element 13 and having a horizontal partition 81 provided with suitable perforations to form a series of spaced valve seats.

An annular check valve 82 is supported slightly spaced below the lower face of the partition 81 by means of a split ring 83 in such a manner that oil may flow from above the partition through the openings into the space below it, as would be the case when the piston 58 is descending. Otherwise expressed, the oil may flow through all of the openings 65 above the partition 81 and thence downwardly into the space between the piston 58 and the partition 81, which space is increasing upon a compression stroke.

The space in the tube 13 above the partition 81 also acts as a reservoir for a reverse supply of oil for the hydraulic shock absorber.

On rebound, however, the check valve 82 is forced upwardly closing the opening in the partition 81 and thereby restricting the flow of fluid from the space above the piston 58 to only those openings 65 below the partition 81. This flow is relatively more rapid in the lowermost position of the piston 58 at the beginning of the rebound stroke as there will be more of the openings 65 below the partition 81. However, as the apparatus approaches the end of the rebound the number of free passages decreases and greater resistance is thus provided.

To enable the telescoping tubes 13 and 14 to slide with a minimum of friction and wear, the ring 34 is recessed to form about the tube 13 a space which is filled with anti-friction rings 84, and the collar 80 is similarly provided with a recess adjacent the tube 14 which is filled with anti-friction rings 85.

Also in the outer surface of the collar 80 near the upper end is provided a groove to receive a piston wiper ring 86 having a groove in its circumference from which lead a number of small ports 87.

In order to prevent the entrapment of air in the upper part of the tube 14, openings 88 are provided through which air may pass to and from the bellows or air spring into the space in the upper part of the tube 14.

To prevent oil from being carried at mist into the bellows a chamber 89 encloses the opening 88 and is filled with filtering material, such as steel wool or the like, as shown at 90. Air may leave the chamber 89 through the opening 91.

It will be apparent that the form and construction of the various elements of the combination may be changed or modified to suit specific conditions and that the above embodiment is merely given by way of example.

*Résumé*

The operation of the air spring is as follows: On a compression caused by a road shock or other cause, the base 11 and the supporting element 12 are brought closer together compressing the bellows 10. At the same time the tube 14 approaches closer to the bottom of member 11 carrying with it the collar 34. This permits the locking sleeve 31 to be in the position shown in broken lines in Fig. 1. The air compressed in the bellows may flow freely through the valves 21 and 22 into the reservoirs 19 and 20. At the same time the oil or shock absorber fluid flows from the space below the piston 58 upwardly through the openings 65 into the spaces above the piston. Upon rebound the air compressed in the bellows or air spring 10 tends to throw the supporting element 12 upwardly and to give it a substantial momentum. This is checked by the fact that the amount of air in the bellows has been decreased by the amount that has been displaced into the reservoirs 19 and 20 so that the expansive force of the air expends itself more rapidly and with less violence.

As the supporting element 12 approaches its normal loaded position the valve check sleeve 31 is lifted to its full line position and the valves 29 and 30 are opened thus permitting air entrapped under pressure in the reservoirs 19 and 20 to flow back into the bellows or air spring to restore the initial supporting pressure in the bellows. At the same time the upward stroke of the piston 58 forces the check valve 82 closed, then the liquid between piston 58 and partition 81 is forced through ports 65 into the hollow stem 60, inasmuch as the piston must displace this liquid as it rises. The resistance to this displacement also increases progressively as the piston rises as the number of openings 65 below the partition 81 through which the oil flows decreases with the rise of the cylinder and the stem 60. The rebound, therefore, is checked by the entrapment of a part of the air compressed on a compression stroke and its exclusion from the bellows until near the end of the rebound, and also by the increasing resistance to flow of the shock absorber fluid.

What I claim is:

1. A pneumatic spring comprising a pneumatic bellows, a reservoir communicating with said bellows, a check valve opening from said bellows to said reservoir, a second check valve opening from said reservoir to said bellows and a locking means movable by said bellows when compressed to a predetermined distance to hold said second check valve closed and to release said valve when said bellows expands above said predetermined distance.

2. A spring which comprises a pneumatic bellows, a support for said bellows, a pair of telescoping tubes extending upwardly through said bellows, the lower of said tubes being secured to said support and the upper of said tubes to the upper part of said bellows, the tubes telescoping when said bellows is compressed, a reservoir communicating with said bellows and having a check valve opening inwardly to said reservoir and a second check valve opening outwardly to said bellows, a member slidably carried by the upper of said telescoping tubes and positioned to hold said second check valve closed when said upper telescoping tube is below a predetermined position.

3. A spring which comprises a pneumatic bellows, a support for said bellows, a pair of telescoping tubes extending upwardly through said bellows, the lower of said tubes being secured to said support and the upper of said tubes to the upper part of said bellows to telescope when said bellows is compressed, a reservoir communicating with said bellows and having a check valve opening inwardly to said reservoir and a second check valve opening outwardly to said bellows, a valve control sleeve carried slidably on said upper telescoping tube to move with said tube in position to hold said second check valve closed when the upper tube is below a predetermined level relative to said lower tube.

4. A spring which comprises a pneumatic bellows, a support for said bellows, a pair of telescoping tubes extending upwardly through said bellows, the lower of said tubes being secured to said support and the upper of said tubes to the upper part of said bellows to telescope when said bellows is compressed, a reservoir communicating with said bellows and having a check valve opening inwardly in said reservoir and a second check valve opening outwardly to said bellows, a check valve control member carried by the upper of said telescoping tubes to move with said tube in position to hold said second check valve closed when the tubes telescope and to release it when they extend to a predetermined distance, a piston slidable in the lower of said telescoping tubes and having a hollow stem extending upwardly and secured to the upper part of said bellows, said stem having longitudinally spaced perforations, a partition enclosing said stem above said piston and a downwardly opening check valve in said partition.

5. The spring of claim 4 having a filling tube extending upwardly through said piston and stem to a level above said partition.

6. The spring of claim 4 having communication between said bellows and the upper of said telescoping tubes to permit the free passage of air therebetween.

7. A spring which comprises a base, a tube fixed on and extending upwardly from said base, a partition dividing said tube into an upper and a lower space, said partition having a valve opening and a downwardly opening check valve, a tube telescoping and slidable fluid-tight on said fixed tube, a piston slidable in said fixed tube and having a hollow stem extending through said partition and secured at its upper end to said sliding tube, said stem having vertically spaced openings, a shoulder on the lower end of said sliding tube, a bellows secured at its upper end to said sliding tube and at its lower end to said base and providing a space about said tubes, a reservoir having an inlet check valve from said bellows and an outward check valve to said bellows, a sleeve carried on said shoulder and extending in a position to wedge said outward check valve closed when said telescoping tubes shorten and to lift and free said check valve when said tubes lengthen to a predetermined distance.

8. A pneumatic spring comprising a pneumatic bellows, a reservoir communicating with said bellows, a check valve to permit movement of air from said bellows to said reservoir, a return valve from said reservoir to said bellows and means actuated by said bellows when compressed below a fixed distance to close said return valve and to open said return valve above said distance.

9. A pneumatic spring comprising a pneumatic bellows, a reservoir communicating with said bellows, a pair of telescoping tubes within said bellows, a check valve to admit fluid from said bellows to said reservoir, a return valve and a lock on said telescoping tubes to close said return valve when said tubes are telescoped below a fixed distance and to release said valve above said distance.

10. The pneumatic spring of claim 9 having a piston slidable in said tubes within the movement of said bellows and a valve to permit fluid to flow from the space below said piston to the space above it and to permit a restricted flow of fluid in opposite directions.

STEPHEN LEONARD CHAUNCEY COLEMAN.

REFERENCES CITED

The following references are of record in the file of this patent:

UNITED STATES PATENTS

| Number | Name | Date |
|---|---|---|
| 1,142,162 | Gruss | June 8, 1915 |
| 1,488,646 | Nygaard | Apr. 7, 1924 |
| 1,555,199 | Gouirand | Sept. 29, 1925 |
| 1,980,832 | Saforcada | Nov. 13, 1934 |
| 2,031,000 | Mercier | Feb. 18, 1936 |
| 2,213,242 | Johnson | Mar. 9, 1943 |
| 2,348,160 | Thornhill | May 2, 1944 |
| 2,393,493 | Brown | Jan. 22, 1946 |

FOREIGN PATENTS

| Number | Country | Date |
|---|---|---|
| 288,327 | Italy | Sept. 4, 1931 |